(12) United States Patent
Hara

(10) Patent No.: US 9,864,557 B2
(45) Date of Patent: Jan. 9, 2018

(54) NETWORK PRINTER

(71) Applicant: KYOCERA Document Solutions Inc., Osaka-shi, Osaka (JP)

(72) Inventor: Nobuhiro Hara, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/358,183

(22) Filed: Nov. 22, 2016

(65) Prior Publication Data

US 2017/0147268 A1    May 25, 2017

(30) Foreign Application Priority Data

Nov. 24, 2015   (JP) ................................. 2015-229089

(51) Int. Cl.
*G06F 3/12* (2006.01)
*H04N 1/00* (2006.01)
*H04N 1/21* (2006.01)

(52) U.S. Cl.
CPC .......... *G06F 3/1286* (2013.01); *G06F 3/1236* (2013.01); *H04N 1/00411* (2013.01); *H04N 1/21* (2013.01); *H04N 2201/0094* (2013.01)

(58) Field of Classification Search
CPC ................................................... G06F 3/1286

USPC ........................................................ 358/1.15
See application file for complete search history.

(56) References Cited

U.S. PATENT DOCUMENTS

2005/0024682 A1* 2/2005 Hull ................... G06F 17/30017
                                                                    358/1.18
2012/0268784 A1* 10/2012 Mori .................. H04N 1/00244
                                                                    358/1.15

FOREIGN PATENT DOCUMENTS

JP     2007257069 A     10/2007
JP     2008199151 A     8/2008

* cited by examiner

*Primary Examiner* — Jacky X Zheng

(57) ABSTRACT

The multifunctional peripheral includes a download control unit, a determination unit, a storage control unit, a display screen data generation unit, and a display control unit. The determination unit determines whether or not data downloaded by the download control unit contains printable file data. If the determination unit determines that the data contains printable file data, the storage control unit performs control so as to extract the printable file data and store the printable file data in the cache memory. The display screen data generation unit generates display screen data to be displayed on the display screen. The display screen data is a list of the file data stored in the storage unit by the storage control unit. The display control unit performs control so as to display the display screen data, which is generated by the display screen data generation unit, on the display screen.

4 Claims, 5 Drawing Sheets

NETWORK PRINTER

INCORPORATION BY REFERENCE

The disclosure of Japanese Patent Application No. 2015-229089 filed on Nov. 24, 2015 including the specification, drawings and abstract is incorporated herein by reference in its entirety.

BACKGROUND

This disclosure relates to a printer.

Printers, typified by multifunction peripherals, read an image of an original document by using an image reading unit, and then emit light to a photoreceptor in an image forming unit based on the read image to form an electrostatic latent image on the photoreceptor. Then, the printers apply a charged developer, such as toner, onto the formed electrostatic latent image to make it into a visible image that is in turn transferred onto a sheet of paper and fixed, and eject the sheet with the image fixed thereon.

It is common these days for printers to be connected to networks, such as the Internet. Printers connected to the Internet have been already known to have some techniques for printing web pages being viewed.

Some typical printers are configured to remove banner advertisements when printing out web pages. Some other typical printers are configured to acquire a printer-friendly web page linked with an original web page to print out the printer-friendly web page.

SUMMARY

A printer according to this disclosure is capable of communicating with an external device via a network. The printer includes a printing unit, a storage unit, an operation unit, a network interface unit, a connection request acceptance unit, a download control unit, a determination unit, a storage control unit, a display screen data generation unit, and a display control unit. The printing unit forms an image on paper for printing. The storage unit stores data. The operation unit includes a display screen on which data is displayed. The operation unit serves as an interface between the printer and a user. The network interface unit is used to connect to the network. The connection request acceptance unit accepts a connection request to connect to the network. If the connection request acceptance unit accepts the connection request, the download control unit downloads data that is displayable on the display screen from the exterior device to the printer via the network by means of the network interface unit. The determination unit determines whether or not the data downloaded by the download control unit contains printable file data. If the determination unit determines that the data contains printable file data, the storage control unit performs control so as to extract the printable file data and store the printable file data in the storage unit. The display screen data generation unit generates display screen data to be displayed on the display screen, the display screen data is a list of the file data stored in the storage unit by the storage control unit. The display control unit performs control so as to display the display screen data, which is generated by the display screen data generation unit, on the display screen.

DETAILED DESCRIPTION

Figure 1:
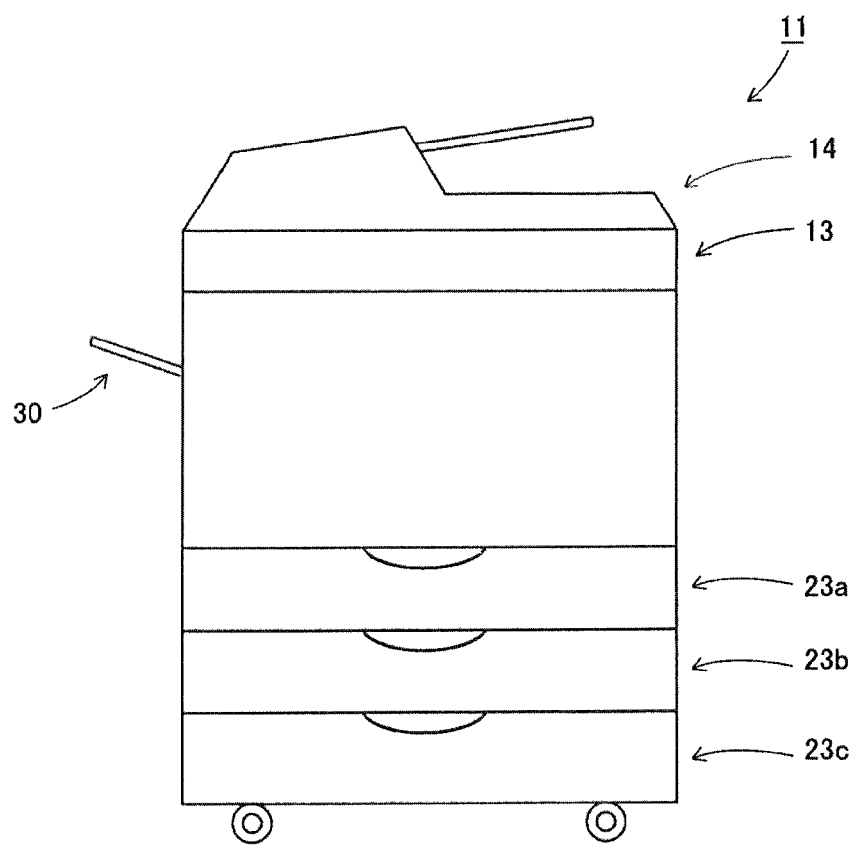
FIG. 1 is a schematic external view of a multifunction peripheral to which the printer according to an embodiment of the present disclosure is applied.
Figure 2:
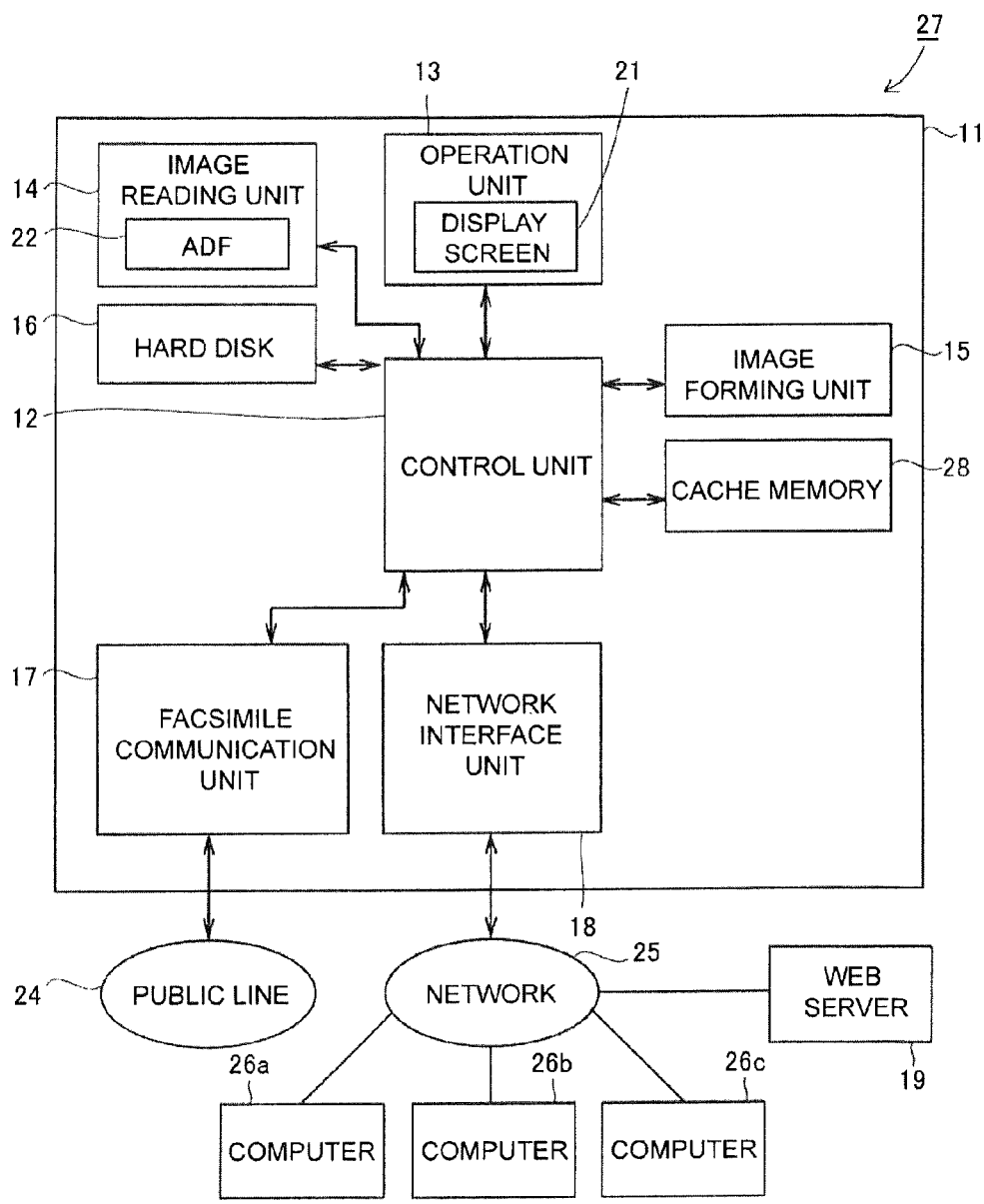
FIG. 2 is a block diagram showing the configuration of the multifunction peripheral shown in FIG. 1.

An embodiment of the present disclosure will be described below. FIG. 1 is a schematic external view of a multifunction peripheral to which the printer according to the embodiment of the present disclosure is applied. FIG. 2 is a block diagram showing the configuration of the multifunction peripheral shown in FIG. 1.

Referring to FIGS. 1 and 2, the multifunction peripheral 11 includes a control unit 12, an operation unit 13, an image reading unit 14, an image forming unit 15, a hard disk 16, a facsimile communication unit 17, three paper feed cassettes 23a, 23b, 23c, a cache memory 28 serving as a storage unit, and a network interface unit 18 used to connect to a network 25.

The control unit 12 controls the entire multifunction peripheral 11. The operation unit 13 includes a display screen 21 that displays information submitted from the multifunction peripheral 11 and entries made by users. The operation unit 13 allows the users to input image forming conditions, such as the number of copies and gradation degrees, and to turn on or off the power source. The image reading unit 14 includes an auto document feeder (ADF) 22 serving as a document transporting device that transports an original document placed on a loading position to a reading position. The image reading unit 14 reads an image of the original document loaded in the ADF 22 or placed on a document table (not shown). The image reading unit 14 also reads an image of a printed signature/seal form which will be described later. The image forming unit 15 forms an image on paper transported from the paper feed cassettes 23a to 23c, based on an image read by the image reading unit 14 or image data transmitted via the network 25. The paper with the image formed by the image forming unit 15 is ejected onto an ejection tray 30. The hard disk 16 stores the transmitted image data, the input image forming conditions, and so on. The cache memory 28 temporarily stores data to accelerate the so-called response speed of image processing. The facsimile communication unit 17 is connected to a public line 24 and performs facsimile transmission and reception.

The arrows in FIG. 2 indicate control signal flows and data flows relating to control operations and images. If the external device to which the multifunction peripheral 11 is connected is a web server 19, the network 25 is the Internet.

The multifunction peripheral 11 operates as a copier by enabling the image forming unit 15 to form an image based on image data of a document read by the image reading unit 14. In addition, the multifunction peripheral 11 operates as a printer by enabling the image forming unit 15 to form an image and print it on paper based on image data transmitted through the network interface unit 18 from computers 26a, 26b, 26c connected to the network 25. In other words, the image forming unit 15 operates as a printing unit for printing required images on paper. The multifunction peripheral 11 operates as a facsimile by receiving image data transmitted from the public line 24 through the facsimile communication unit 17 and enabling the image forming unit 15 to form an image using the image data via DRAM, or by transmitting image data of a document, read by the image reading unit 14, through the facsimile communication unit 17 to the public line 24. The multifunction peripheral 11 has a plurality of functions relating to image processing, such as a copying function, a printer function, and a facsimile function. The multifunction peripheral 11 also has a function of minutely setting each of the functions.

The multifunction peripheral 11 according to the embodiment of this disclosure and the computers 26a, 26b, 26c connected to the multifunction peripheral 11 via the network 25 establish a print system 27. This embodiment shows three computers 26a to 26c. Each of the computers 26a to 26c can make a print request to the multifunction peripheral 11 via the network 25 to perform a printing operation.

Figure 3:
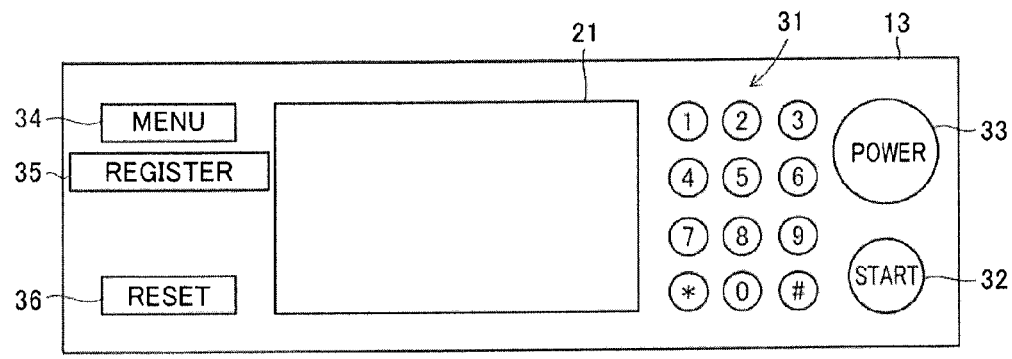
FIG. 3 illustrates the configuration of an operation unit.

Next, the configuration of the aforementioned operation unit 13 will be described for further details. FIG. 3 is an external view schematically showing the configuration of the operation unit 13. Referring to FIG. 3, the operation unit 13 includes numeric keys 31 including number keys 0 to 9 used by users to input the number of copies or the like and symbol keys like "*" and "#", a start key 32 used to provide instructions to start printing and to send a fax, a power key 33 used to turn on and off the power source of the multifunction peripheral 11, a menu key 34 used to provide instructions to select one of the functions, such as a printer function or a copying function, of the multifunction peripheral 11, a register key 35 used to provide instructions to register various image forming conditions and user information, a reset key 36 used to cancel the instructions input by users with the numeric keys 31 and the other keys, and the aforementioned display screen 21. The display screen 21 is a liquid crystal display with a touch panel function that allows users to input image forming conditions and so on, and to select from among the functions by pressing the display screen 21 with their fingers.

Figure 4:
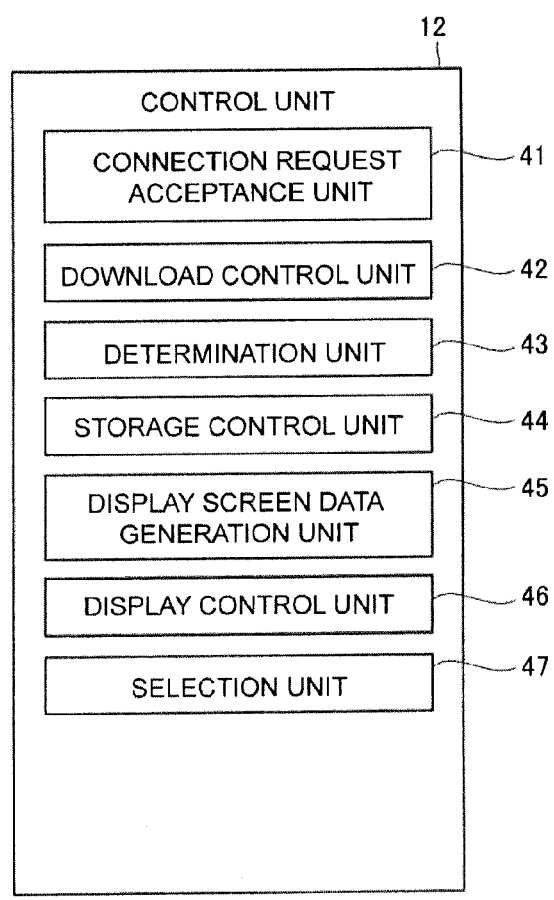
FIG. 4 is a block diagram showing the configuration of a control unit.

Next, the configuration of the control unit 12 will be described. FIG. 4 is a block diagram showing the configuration of the control unit 12. Referring to FIG. 4, the control unit 12 includes a connection request acceptance unit 41, a download control unit 42, a determination unit 43, a storage control unit 44, a display screen data generation unit 45, a display control unit 46, and a selection unit 47. The connection request acceptance unit 41 accepts a connection request to connect to the network 25. When the connection request acceptance unit 41 accepts a connection request, the download control unit 42 downloads data displayable on the display screen 21 to the multifunction peripheral 11 from an external device, the web server 19 in this embodiment, via the network 25 using the network interface unit 18. The determination unit 43 determines whether or not the data downloaded by the download control unit 42 contains printable file data. If the determination unit 43 determines that the data contains printable file data, the storage control unit 44 performs control so as to extract the printable file data and store the printable file data in the cache memory 28. The display screen data generation unit 45 makes a list of the file data stored in the cache memory 28 by the storage control unit 44 to generate display screen data to be displayed on the display screen 21. The display control unit 46 performs control so as to display the display screen data, which is generated by the display screen data generation unit 45, on the display screen 21. The selection unit 47 allows selection of whether to display the display screen data generated by the display screen data generation unit 45 on the display screen 21. Specifically, the selection unit 47 makes the user select whether to activate the display control unit 46. Thus, the display control unit 46 is activated if display of the display screen data on the display screen 21 is selected through the selection unit 47.

Figure 5:
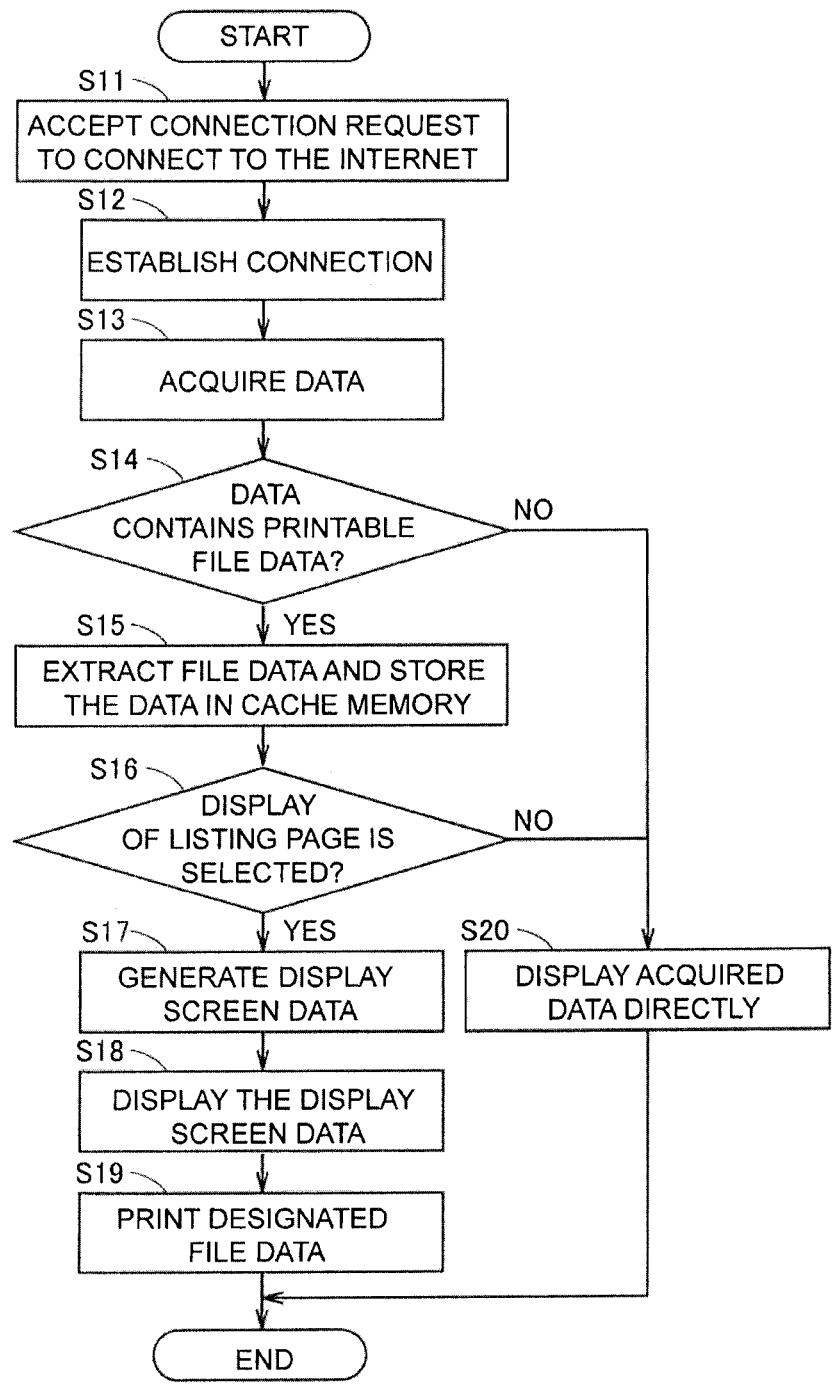
FIG. 5 is a flowchart describing an operational procedure to print file data of a web page on the Internet using the multifunction peripheral according to the embodiment of the disclosure.

Next, a description will be made about how the multifunction peripheral 11 according to the embodiment of the disclosure prints the file data downloaded from the Internet. FIG. 5 is a flowchart describing an operational procedure to print the file data of a web page on the Internet using the multifunction peripheral 11 according to the embodiment of the disclosure.

Referring to FIG. 5, firstly, the connection request acceptance unit 41 accepts a connection request to connect to the Internet from a user (step S11 in FIG. 5, hereinafter, "step" is omitted). The connection request acceptance unit 41 that has accepted the connection request establishes connection with the web server 19 via the network 25, which is the Internet, using the network interface unit 18 (S12). Then, the download control unit 42 downloads data items of a displayed file, which is linked to a web page, from the web server 19 to acquire the data items (S13).

Afterward, the determination unit 43 determines whether a plurality of the downloaded data items contain printable file data items (S14). An example of printable file data items is document file data, such as a PDF file, provided with a link.

If the determination unit 43 determines that the data items contain printable file data items (YES in S14), the storage control unit 44 has the printable file data items extracted and stored in the cache memory 28 (S15).

Then, it is determined whether the display of a listing page presenting a list of the printable file data items is selected (S16). The user selects to display the listing page if it is needed.

Figure 6:
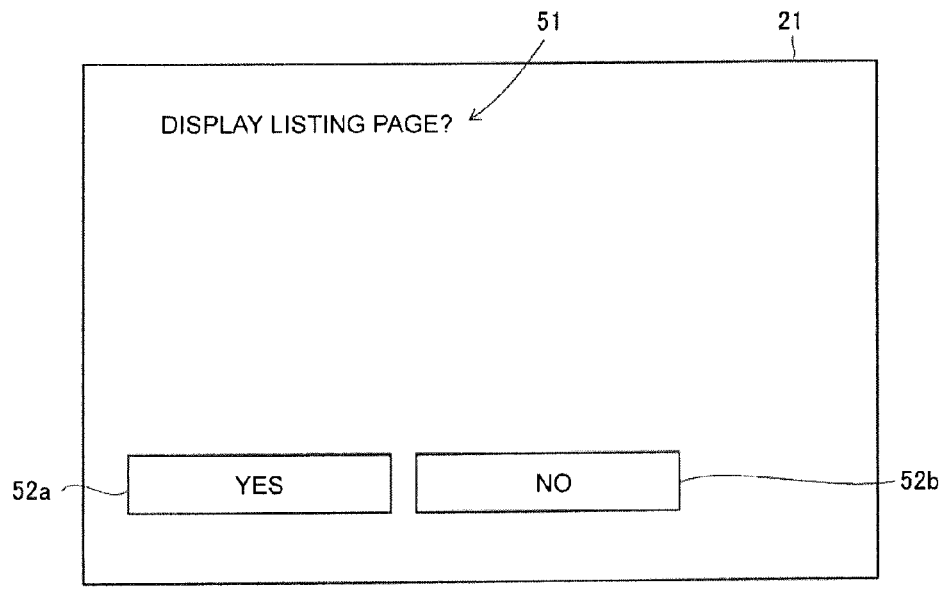
FIG. 6 illustrates an example display screen.

FIG. 6 shows an example of the display screen 21 to have the user select to display the listing page. Referring to FIG. 6, the display screen 21 shows an inquiry message 51 "Display a listing page?", a selection key 52a labeled "YES" that is pressed to select to display the listing page, and a selection key 52b labeled "NO" that is pressed to select not to display the listing page.

The user presses the selection key 52a "YES" on the display screen 21 shown in FIG. 6. In response to the press, the selection unit 47 recognizes that display of the listing page on the display screen 21 has been selected (YES in S16).

Subsequently, the display screen data generation unit 45 generates display screen data with the printable file data items stored in the cache memory 28 (S17). More specifically, the display screen data generation unit 45 arranges the file names of the file data items in a column to represent the file data items in a tabular form that is a listing page generated as the display screen data. The display control unit 46 displays the generated display screen data on the display screen 21 (S18).

Figure 7:
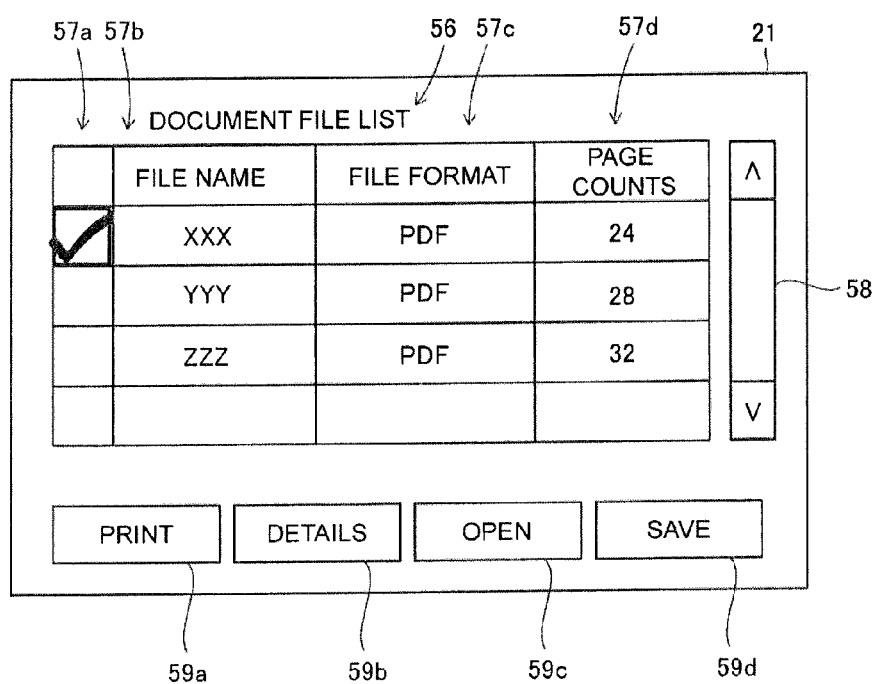
FIG. 7 illustrates an example display screen.

FIG. 7 illustrates an example of the display screen when the display screen data is generated. Referring to FIG. 7, the display screen 21 shows a message 56 with the wording "Document file list", a check box field 57a, a field 57b to indicate the file names of the file data items, a field 57c to indicate the formats of the file data items, a field 57d to indicate the page counts of the file data items, a scroll bar 58 used to scroll the display screen 21 up and down, a selection key 59a labeled "Print" that is pressed to print the designated a file data item, a selection key 59b labeled "Details" that is pressed to show further detailed information of the designated file data item, a selection key 59c labeled "Open" that is pressed to open the file of the designated file data item to display its contents, and a selection key 59d labeled "Save" that is pressed to store the file of the designated file data item in the hard disk 16.

Then, the user selects a file name to be printed using the display screen 21 having a touch panel function and presses a box associated with the selected file name in the check box field 57a to designate the file name to be printed. In FIG. 7, a file data item with a file name "XXX" listed on the top is checked. Pressing the selection key 59a triggers the image forming unit 15, serving as a printing unit, to form an image based on the file data item corresponding to the designated file name "XXX" and to print the image on paper (S19).

In the case where the determination unit 43 determines that the downloaded data items do not contain any printable file data items (NO in S14), or in the case where the user presses the selection key 52b to select not to display the listing page (NO in S16), ordinary data, which is the downloaded data items, is displayed directly on the display screen 21 (S20).

This multifunction peripheral 11 extracts printable file data items and makes a list of the file data items to display the file data items on the display screen, thereby making it easy for the user to search for the file data items that the user intends to print. This can reduce the number of times the user scrolls the display screen 21 and the number of times the user changes the contents to be displayed on the display screen 21. Thus, the risk of complicating the user's operations also can be reduced. Therefore, this multifunction peripheral 11 can provide improved operability to the user making a print request.

Since the display control unit 46 is activated by the user selecting display of the display screen data on the display screen 21 through the selection unit 47, the display screen 21 can create a display as requested by the user.

In addition, the display screen data generated by the display screen data generation unit 45 has file names arranged in a column and in a tabular form, which makes it easy for the user to visually recognize printable files.

In the aforementioned embodiment, the storage control unit 44 can be configured to extract file data items organized hierarchically and to store them. This can provide further improved operability to the user.

Although the storage control unit 44 is configured to store the printable file data items in the cache memory 28 in this embodiment, the present disclosure is not limited thereto and, the storage control unit 44 can have the printable file data stored in the hard disk 16, for example.

Although the operation unit 13 is configured to display web pages on the Internet on the display screen 21 using a web browser, and the download control unit 42 is configured to download the data of the web pages in the above-described embodiment, the present disclosure is not limited thereto, and can be applied to the multifunction peripheral that is connected to, for example, an intra-company network 25, such as an intranet.

It should be understood that the embodiment disclosed herein is illustrative and non-restrictive in every respect. The scope of the present disclosure is defined by the terms of the claims, rather than by the foregoing description, and is intended to include any modifications within the scope and meaning equivalent to the terms of the claims.

The printer according to the present disclosure can be effectively used especially to meet a demand for improved user operability.

What is claimed is:

1. A printer capable of communicating with an external device via a network, comprising:
    a printing unit that forms an image on paper for printing;
    a storage unit that stores data;
    a network interface unit that is used to connect to the network;
    a control unit controlling the entire image forming apparatus, wherein
    the control unit executes an operation unit that includes a display screen on which data is displayed and functions as an interface between the printer and a user;
    a connection request acceptance unit that accepts a connection request to connect to the network;
    a download control unit that if the connection request acceptance unit accepts the connection request, downloads data displayable on the display screen from the external device to the printer via the network by means of the network interface unit;
    a determination unit that determines whether or not the data downloaded by the download control unit contains printable file data;
    a storage control unit that if the determination unit determines that the data contains printable file data, performs control so as to extract the printable file data and store the printable file data in the storage unit;
    a display screen data generation unit that generates display screen data to be displayed on the display screen, the display screen data being a list of the file data stored in the storage unit by the storage control unit;
    a selection unit that allows selection of whether to display the display screen data generated by the display screen data generation unit on the display screen; and
    a display control unit that if display of the display screen data on the display screen is selected through the selection unit, performs control so as to display the file names of the display screen data and check box for printing selection associated with a selected file name, which is generated by the display screen data generation unit, on the display screen,
    the operation unit is capable of displaying a web page on the Internet on the display screen by using a web browser,
    the download control unit downloads the data items of a displayed file, which is linked to the web page, and
    the display control unit that if the determination unit determines that the downloaded data items do not contain any printable file data items or display of the display screen data on the display screen is not selected through the selection unit, performs control so as to display the downloaded data items on the display screen.

2. The printer according to claim 1, wherein the display screen data generated by the display screen data generation unit is a list of the file data arranged in a column.

3. The printer according to claim 1, wherein the storage unit includes a cache memory.

4. The printer according to claim 1, wherein the storage control unit extracts the file data organized hierarchically and stores the file data.

* * * * *